(12) United States Patent
Peidous et al.

(10) Patent No.: US 11,047,675 B2
(45) Date of Patent: Jun. 29, 2021

(54) METHOD AND APPARATUS FOR INSPECTION OF SPHERICAL SURFACES

(71) Applicants: Valerie Peidous, Liberty Township, OH (US); Vassili Peidous, Liberty Township, OH (US); Nina Peydus, Liberty Township, OH (US)

(72) Inventors: Valerie Peidous, Liberty Township, OH (US); Vassili Peidous, Liberty Township, OH (US); Nina Peydus, Liberty Township, OH (US)

( * ) Notice: Subject to any disclaimer, the term of this patent is extended or adjusted under 35 U.S.C. 154(b) by 295 days.

(21) Appl. No.: 16/423,115

(22) Filed: May 27, 2019

(65) Prior Publication Data

US 2020/0378755 A1    Dec. 3, 2020

(51) Int. Cl.

| | |
|---|---|
| *G01B 11/24* | (2006.01) |
| *G01N 21/95* | (2006.01) |
| *G01B 11/30* | (2006.01) |
| *G01B 7/34* | (2006.01) |
| *G01B 7/004* | (2006.01) |
| *G01B 7/28* | (2006.01) |
| *G01B 7/293* | (2006.01) |
| *G01B 11/255* | (2006.01) |

(52) U.S. Cl.
CPC .......... *G01B 11/2408* (2013.01); *G01B 7/004* (2013.01); *G01B 7/282* (2013.01); *G01B 7/293* (2013.01); *G01B 7/34* (2013.01); *G01B 11/255* (2013.01); *G01B 11/303* (2013.01); *G01N 21/951* (2013.01); *G01N 21/9506* (2013.01)

(58) Field of Classification Search
CPC . G01B 311/24; G01B 11/2408; G01B 11/255; G01N 21/9506; G01N 2021/9583
See application file for complete search history.

(56) References Cited

U.S. PATENT DOCUMENTS

| | | | |
|---|---|---|---|
| 8,823,950 B2 * | 9/2014 | Nakauchi | G01B 11/24 356/612 |
| 2014/0278188 A1 * | 9/2014 | Yuditsky | G01B 21/045 702/104 |

* cited by examiner

*Primary Examiner* — Rebecca C Bryant

(57) ABSTRACT

Disclosed are a method and an apparatus for inspection of workpieces and products having curved and, in particular, spherical surfaces. The method is based on scanning inspected objects with a narrow probing beam of electromagnetic radiation and concurrently measuring the radiation scattered on the surface. The method and apparatus improve the detectability of features and imperfections on inspected surfaces by providing invariable parameters and conditions of scanning, robust mechanical stability of scanning systems, high positioning accuracy of the probing electromagnetic beam and efficient collection of the scattered radiation. The apparatus allows surface defect classification, determining defect dimensions and convenient automation of inspection.

20 Claims, 8 Drawing Sheets

METHOD AND APPARATUS FOR INSPECTION OF SPHERICAL SURFACES

FIELD OF THE INVENTION

The present invention belongs to the field of manufacturing products with high quality surfaces. More specifically, it relates to the quality assessment of workpieces and products having curved surfaces. In particular, the present invention is directed to determining roughness and detecting such imperfections as scratches, digs, chips, coating defects and contamination on spherical, near-spherical and aspherical surfaces. The solutions of the present invention may be especially effective in inspection of optical components such as lenses and mirrors.

BACKGROUND OF THE INVENTION

Defects and imperfections on surfaces of optical components scatter and absorb light. In general, this leads to a degraded performance of optical systems. Scratches and digs increase background light and decrease optical image contrast. In high power laser applications, the scattered radiation may damage optical components due to a localized heating of their defective areas. Another example is semiconductor photolithography tools in which the defects on the surfaces of optical components cause parasitic diffraction and reduce the resolution and the ability to print features of critical dimensions.

Accordingly, the quality control is an important procedure in production and maintenance of high quality optical components and systems. The conventional requirements for surface quality are defined in Military Surface Quality Specification "Mil-PRF-13830B, U.S. Department of Defense (1963)". The "Deutsche Industrie Norm" specification "DIN 3140, Sheet 7, is also widely used in quality control for optical components. International standard ISO-10110 "Optics and photonics—Preparation of drawings for optical elements and systems—Part 7: Surface imperfections" defines the levels of acceptability of surface imperfections for optical components and optical assemblies. The standard "ANSI/OEOSC OP1.002-2017: Optics and Electro-Optical Instruments—Optical Elements and Assemblies—Surface Imperfections" of American National Standards Institute (2009)", provides a guidance for inspecting transparent and reflective optical elements for scratches, digs, edges, coatings, bubbles and inclusions.

Most quality control procedures for optical components are based on inspection conducted by trained operators. An inspected component is placed under a preferred illumination and observed with naked eye. Operators obtain a visual perception about the quality of inspected optical components comparing the observed features with imperfections seen on reference samples with identified, characterized and quantified defects. Though, the naked eye sensitivity is not sufficient for identification of small imperfections having dimensions of less than about 10 micrometers. With naked eye, defect detection may greatly depend on illumination conditions which are always subjective at operator inspection.

U.S. Pat. No. 6,636,299 "Intraocular lens inspection method" by Akira Miyata, issued in April 2002, discusses a method of inspecting intraocular lenses prior to clinical use. It deals with the quality problem of lens "glistening" that may develop due to defects in lens materials and materials processing during lens manufacturing. An inspection method is proposed that is based on analyzing a test group of lenses taken from an inspected batch. It involves a sequential exposure of lenses to different ambient and different temperatures with macroscopic and microscopic observations. The changes in optical appearances are tracked and conclusions are derived on the lens susceptibility to glistering. The proposed inspection is lengthy and addresses the lens material stability rather than detection of existing defects.

The imperfections may be identified with naked eye because of refracting, scattering and shading effects that often provide a misleading perception about the size and nature of defects. Totally absorbing small defects may not be seen at all. All these drawbacks of operator inspection limit quality standardization, refrain from advancements in achieving higher quality of optical components, allow escapes of poor quality and reliability failures of optical systems. Accordingly, there is a need in methods and equipment for automated inspections of optical components.

U.S. Pat. No. 6,047,082 "Automatic lens inspection system" by Harvey E. Rhody et al., issued in April 2000, describes an automatic system for inspecting contact lenses. Several electronic images are taken for a lens sequentially with rotational dispositions of the lens supporting system. The images are compared and image features that move with respect to the lens are eliminated as artifacts. The proposed system improves the validity of inspection results that is essential for inspection automation. However, the system can only be used for inspecting relatively small lenses. The system does not address the detectability of smaller defects.

U.S. Pat. No. 6,373,578 "Lens inspection system" by Hiroshi Nishikawa, issued in April 2002, describes a lens inspection apparatus for evaluating optical systems by measuring a wave front of a light beam emerged from the systems. The apparatus is specifically designed for testing optical data recording and data reproducing devices. It allows to determine if an objective lens of a recording device is damaged or misplaced so that a beam spot on an optical disc is not properly focused on the data recording surface and recording of data at high density is compromised. Therefore, the proposed inspection apparatus tests the integrated performance of a lens and does not provide information about localized surface defects.

U.S. Pat. No. 6,765,661 "Lens inspection" by Roger Biel et al., issued in July 2004, describes an apparatus designed to improve the objectiveness of defect evaluation in lenses. An inspected lens is simultaneously inspected in dark and bright field systems combined in the apparatus. The dark field system detects shape and integrity of imperfections as well as surface defects. The bright light system detects bulk defects such as bubbles. The images are captured by a CCD camera and, therefore, the lens inspection may be automated. The proposed solution does not address the detectability of small defects.

U.S. Pat. No. 7,855,782 "Lens inspection system using phase contrast imaging" by Roger Biel et al., issued in December 2010, proposes an inspection apparatus and a method for automatic inspection of lenses. The inspection utilizes a phase contrast imaging that provides high reliability in identifying "truly" defective lenses. The difference of intensity due to in-phase or phase-shifted interference is captured as an image. Then, the image is used for detecting accuracy of size, surface defects, tears, peripheral ruptures and inclusions such as bubbles and foreign bodies, as well as small defects at the edges of the lenses. The image is automatically processed by a computer system that also decides if the inspected lens meets the applied acceptance criteria. The concern is that the phase contrast imaging may be very sensitive to geometrical characteristics of lenses such as thickness and curvature. Then, the related image contrast may mask the image contrast corresponding to localized lens defects.

U.S. Pat. No. 8,976,250 "Lens inspection system" by Joel S. Armstrong-Muntner, et al., issued in March 2015, presents a lens testing approach using a light illumination source that provides specially designed light patterns. The surface of an inspected lens reflects the test pattern of light. A digital camera captures images of the reflected light. Computing equipment performs image processing operations to evaluate the captured images with the reference to the expected reflection from a qualified lens. In the result, the information about the presence of lens defects is derived. This approach implies a full automation but it may hardly be applied for precise identification and quantification of individual defects on lens surfaces.

Most advanced capabilities for surface inspection have been developed, evolved and routinely applied for quality control of semiconductor wafers that are workpieces having essentially mirror surfaces. The prime attention of wafer inspection relates to surface roughness, localized defects, large area defects and scratches. Wafer surface analysis is based on an extensive scanning of wafer surface with a laser beam. The laser beam radiation scattered on surface imperfections is collected and quantified. Judging on the intensity of the scattered laser radiation, types of surface defects and their dimensions are determined. Locations of identified defects on wafer surfaces are recorded and may be reported as defect distribution maps. Automated sorting of wafers according to their quality levels is enabled as a standard task.

The advantageous performance of wafer inspection systems is related to the utilized "spiral" laser scanning. It is conventionally implemented with a stationary systems of laser illumination and detection of scattered and, optionally, reflected radiation. A wafer is spun and simultaneously moved along a radial direction so that a stationary laser beam spot on the wafer surface follows a path of an Archimedes spiral. Spiral scanning was first applied for inspecting wafers decades ago (see Altendorfer, H. and Kren, G. "Unpatterned surface inspection for next-generation devices", Solid State Technology. 1996, Vol. 39, Issue 8, pp. 93-96) and since then it became the mainstream approach that has been providing the highest inspection throughput and favors achieving high sensitivity to imperfections on wafer surfaces (Tuyen K. Tran "Defect Characterization and Metrology" in Ma, Z. and Seiler, D. G. "Metrology and Diagnostic Techniques for Nanoelectronics", Singapore: Pan Stanford (2017), pp. 592-607).

The concept of spiral scanning is illustrated in FIG. 1. A semiconductor wafer 101 is placed on a rotary table that spins the wafer about the wafer center 104. In the embodiment shown in FIG. 1, the wafer spins in the clockwise direction 106 but any direction of spinning may be applied. A laser beam provided by a stationary source illuminates the wafer 101 at a laser spot. The rotary table is mounted on a linear actuator that moves the rotary table with the wafer 101 in the direction 103 perpendicular to the axis of wafer spinning. An inspection starts with a laser spot located at the center 104 of the wafer 101 and then proceeds until the laser spot on the wafer surface reaches the location 102 at the perimeter of the wafer 101. The spinning and linear motions are synchronized such that the scanning goes track-by-track along the spiral path 105 on the surface of the wafer 101. Edges 107 of the scanning tracks are defined by the width or diameter of the laser beam spot. For the illustration, some of the instantaneous laser spots 108 are shown on the last two circles of the spiral path 105. If the distances 109 and 110 between adjacent scanning tracks are equal to or less than the width of the beam spots 108, the entire surface of the wafer 101 is scanned without gaps.

Examples of spiral scanning implementation are discussed in U.S. Pat. No. 4,314,763 "Defect detection system" by Steigmeier, et al.; U.S. Pat. No. 6,201,601 "Sample inspection system" by Vaez-Iravani, et al.; U.S. Pat. No. 6,606,153 "Process and assembly for non-destructive surface inspections" by Marxer, et all.; U.S. Pat. No. 7,791,721 "Surface inspection with variable digital filtering" by Takahashi, et al.; U.S. Pat. No. 8,885,158 "Surface scanning inspection system with adjustable scan pitch" by Wolters, et al.; U.S. Pat. No. 8,891,079 "Wafer inspection" by Zhao, et al.; U.S. Pat. No. 8,934,091 "Monitoring incident beam position in a wafer inspection system" by Reich, et al.; U.S. Pat. No. 9,255,891 "Inspection beam shaping for improved detection sensitivity" by Wolters, et al.; U.S. Patent Application No. 20180038803 "Surface Defect Inspection With Large Particle Monitoring And Laser Power Control" by Cui, et al.; U.S. Pat. No. 5,712,701 "Surface inspection system and method of inspecting surface of workpiece" by Clementi, et al.; U.S. Pat. No. 8,885,158 "Surface scanning inspection system with adjustable scan pitch"; U.S. Pat. No. 9,116,132 "Surface scanning inspection system with independently adjustable scan pitch" by Wolters, et al; etc.

The contemporary systems for surface inspection of semiconductor wafers offer unique detectability of surface imperfections. For example, using 266 nm deep-ultraviolet light source, the systems may detect surface defects smaller than 20 nm. Such high sensitivity to surface defects is essentially achieved owning to the special concept of the tool designs. For the whole process of scanning over the entire wafer surface, it strictly ensures (a) identical conditions of surface illumination by the incident beam of laser radiation and (b) a precise positioning of the laser beam spot on the inspected surface at the focus of optical sub-systems collecting scattered radiation. These scanning conditions restrict the application of the known wafer inspection systems to flat surfaces only. On the other hand, there is a need for high performance inspection of objects with curved surfaces so that high defect detectability and high throughput comparable with wafer inspection systems can be provided.

The authors of the present invention conceived and validated a concept of a method and apparatus which allow inspection of curved surfaces and identification of features with sensitivity and throughput analogous to that of wafer inspection systems. The objective of the present invention is to provide a high throughput and high detectability method and apparatus for inspection of workpieces and products having curved and, in particular, spherical, surfaces. The method and apparatus may be effectively applied for inspection of spherical, near-spherical and aspherical optical components.

SUMMARY OF THE INVENTION

The present invention discloses a method and an apparatus for inspection of workpieces and products having curved and, in particular, spherical, surfaces. Compared to the state-of-the-art solutions, the method and apparatus according to present invention improve the detectability of imperfections on the surfaces and in the sub-surface areas of inspected workpieces and products. The apparatus allows surface defect classification, determining defect dimensions, and convenient automation of inspection. Other beneficial features and capabilities of the disclosed method and apparatus will be conveyed in the detailed description that follows.

The method belongs to a class of inspection technologies based on scanning inspected objects with a narrow probing beam of electromagnetic radiation, such as a light, and concurrently detecting and classifying the electromagnetic radiation scattered on the surface and in the sub-surface areas of the inspected objects. The key advantages of the invented method and apparatus for inspection are achieved through a novel concept of high speed surface scanning that features (a) invariable parameters and conditions of scanning, (b) robust mechanical stability of the scanning systems and parts, (c) high accuracy and consistency of positioning of probing beam with respect to analyzed surfaces and (d) high efficiency and consistency of collection of the probing beam radiation scattered at surface features.

Constant parameters and conditions of scanning, such as the angle of laser beam incidence and the acceptance angle of scattered radiation collection at an inspected surface, are vital for achieving high defect detectability and obtaining quantifiable results of surface quality inspection. These and other attributes and benefits of the present invention are realized in the method for high precision and high resolution inspection of workpieces and products as follows. For simplicity, the description of the method and apparatus according to the present invention will often be related to inspection of optical components. However, all described elements and details of the invention are applicable to inspection of any workpieces and products with relatively smooth curved surfaces. Moreover, because any flat surface may be represented as a particular case of a curved surface with the infinite radius of curvature, the disclosed method and apparatus are applicable for inspection and analysis of workpieces and products having flat surfaces.

An inspected surface of an optical component may be a portion of the overall surface of an optical component. Most optical components have spherical surfaces or surfaces made with intentions to obtain spherical shapes. An inspected optical component may have a spherical surface, near-spherical surface, or a curved surface that may be represented as a complex surface made of several connected spherical surfaces. For the purpose of clarity, all these surfaces are considered below as "spherical" surfaces. The term "spherical surface" in the present disclosure refers to a shape that may be a portion of a geometrical sphere. Accordingly, in the present disclosure, any spherical surface is associated with a "center of the sphere" or the "center of curvature" and a "radius of the sphere" or a "radius of curvature". In other terms, the center of the sphere whose center lies on the concave side of a curved surface, on the normal to a given point of the curved surface, and whose radius is equal to the radius of curvature at that point may be called as "the center of curvature" at that point. Therefore, the center of an imaginary sphere that makes up a spherical surface is "the center of curvature" of that surface. For example, a surface of a spherical lens or mirror has a vertex and a center of curvature located along the optical axis. The distance from the vertex to the center of curvature is the radius of curvature of the surface.

An aspherical surface may be represented by a combination of spherical and near-spherical surfaces. A surface that deviates from a spherical shape may also be inspected using the method and apparatus according to the present invention. In this case, the detectability and precision of the method may degrade but the results of inspection may still provide advantages over those obtained with conventional methods.

According to the present invention, an inspected spherical surface of an object is scanned with a beam of electromagnetic radiation that may be a laser beam. The beam is spun about a spin axis, the spin axis is directed normally or perpendicular towards the surface. Therefore, the spin axis passes through the center of the sphere making up the inspected spherical surface. In other terms, it passes through the center of curvature of the inspected surface. At every instance of scanning, the laser beam illuminates the inspected surface at a probe area that will be called below as a "beam spot". Due to the probing beam spinning, the beam spot follows a circle that will be called below as a beam spot "orbit".

Concurrently, in the method and apparatus according to the present invention, the inspected surface and the spin axis, that is the axis of the probing beam spinning, are set in a relative motion. Both the probing beam spinning and the relative motion of the spin axis with respect to the inspected spherical surface are implemented in a controlled and coordinated way such that a position of an instantaneous beam spot on the inspected surface can be determined at any instance of the scanning process. The relative motion is arranged such that the spin axis is pinned in the center of the sphere making up the inspected surface. In other words, the relative motion of the spin axis with respect to the analyzed spherical surface is restricted such that the spin axis always passes through the center of the sphere.

In the result of the probing beam spinning and the relative motion of the spin axis with respect to the inspected surface, the beam spot follows a controlled and predetermined path on the inspected spherical surface. The entire inspected surface or its portion of interest is scanned with the probing beam of electromagnetic radiation. It is imperative that the angle of incidence of the probing beam on the inspected spherical surface is constant during the whole scanning process. This condition is secured because the spin axis is pinned in the center of the sphere making up the inspected surface.

A portion of probing beam radiation scattered on the inspected surface is collected and its characteristics, such as intensity, power, polarization, etc., are measured synchronously with tracking the instantaneous positions of the beam spot. The features and imperfections on the inspected surface are classified by the characteristics of the scattered radiation. Every distinct imperfection, or defect, or defective area may be associated with specific location on the inspected surface. It is preferred that the collection of the scattered radiation is arranged in a fixed mechanical relationship with the spinning probing beam of electromagnetic radiation. This guarantees that the specific conditions of collecting the scattered radiation, such as collection angle and collection aperture, are preserved constant during the entire scanning process. This provides consistency and high accuracy of surface defect identification and classification.

The attributes and benefits of the present invention are realized in the proposed apparatus for inspection of spherical surfaces. The apparatus comprises an apparatus head, an electronic system for control and data processing, and a system that provides a relative motion between the apparatus head and the inspected surface. The apparatus head may incorporate a source electromagnetic radiation mounted on spinning platform. The source of electromagnetic radiation is powered wirelessly in this case. An external source of electromagnetic radiation, such as a laser, may be optionally used. This option of the apparatus incorporates a set of mirrors which spin the beam of electromagnetic radiation and redirects it towards an inspected surface in a controllable way. Some of the mirrors are mounted on a spinning platform of the apparatus head. The source of electromagnetic radiation illuminates the inspected surface with a beam spot that scans the inspected surface in accordance with the spinning beam of electromagnetic radiation.

The apparatus head includes an optical system for collecting the electromagnetic radiation scattered at the surface features and imperfections. This optical system is also mounted on a spinning platform and transmits the collected radiation to a photodetector. Optionally, the electromagnetic radiation reflected from the surface may be collected and transmitted to another photodetector. The spinning source of electromagnetic radiation and the spinning optical system for radiation collection are in a fixed mechanical relationship. This provides invariable parameters and conditions of scanning and collection of scattered radiation. The photodetector may be affixed on a stationary frame coaxially with the shaft of a motor that spins the components of the apparatus head. The transmission of the collected scattered radiation may be arranged through a hole in the shaft. In this way, a mechanical decoupling between spinning systems and the photodetector is achieved. Alternatively, the photodetector may be mounted on a spinning platform of an apparatus head. This option may include a capability of wireless data transmission for delivering detected and measured characteristics of the scattered electromagnetic radiation from the spinning photodetector to a stationary data processing system such as a computer.

The electronic system controls the spinning of the source of electromagnetic radiation and the motion of the apparatus head with respect to the inspected surface. The electronic system also registers the intensities of the detected scattered radiation and associates it with instantaneous positions of the beam spot guided by the apparatus head on the inspected surface.

The spinning module of the apparatus head is preferably implemented in a compact design and balanced to allow high speed of spinning without causing vibrations. A high spinning rate proportionally enhances the throughput of inspection. A compact implementation allows the apparatus to be portable. In particular, the apparatus may be integrated into inspection hoods and processing chambers of production equipment.

Further areas of applicability of the invented method and possible options of invented apparatus design will become apparent from the following detailed description, claims, and drawings. The detailed description and specific examples are provided for purposes of illustration and are not intended to limit the scope of the invention.

DETAILED DESCRIPTION OF THE INVENTION AND ITS EMBODIMENTS

The following detailed description is merely exemplary in nature and is not intended to limit the invention or applications and uses of the invention. Furthermore, there is no intention to be bound by any terminology and expressed or implied theory presented in the preceding field, background and summary of the invention, or in the following detailed description. The apparatus for inspection of spherical surfaces disclosed in the present invention is a complex system comprising numerous components that interact mechanically, optically and electrically in an intricate and coordinated manner. Some of those components and their interactions may not be described in detail below because they are conventional and known to those skilled in electronics, optics, mechanics, automation or robotics. Embodiments in the present description provide exemplary solutions and do not intend to limit the scope of the invention. The disclosed method and apparatus may have numerous specific implementations that follow the concept of the present invention and its claims.

Figure 1:
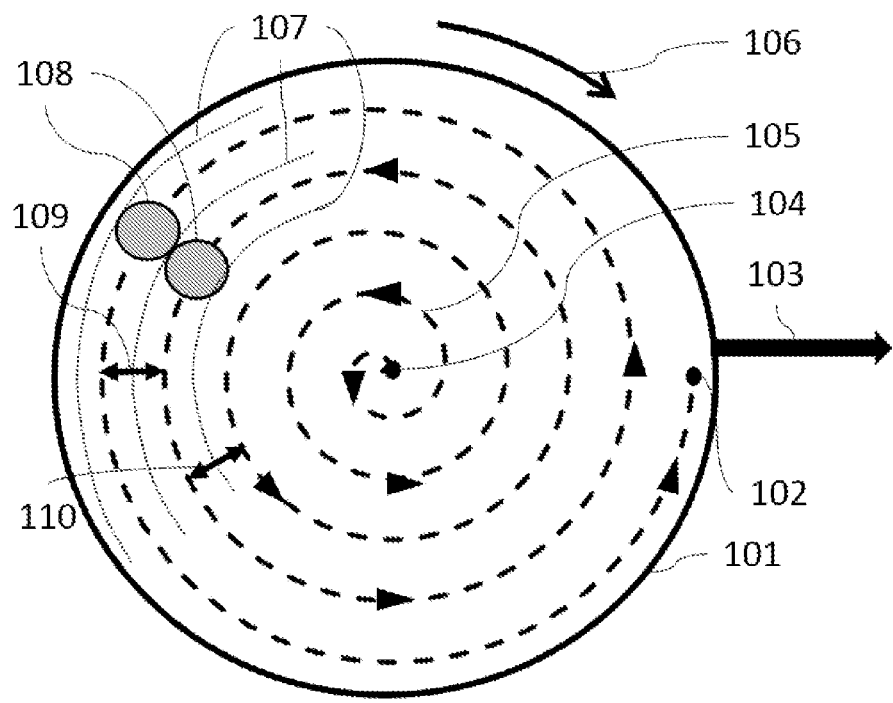
FIG. 1 depicts a spiral scheme of surface scanning utilized in systems for inspection of unpatterned semiconductor wafers.
Figure 2:
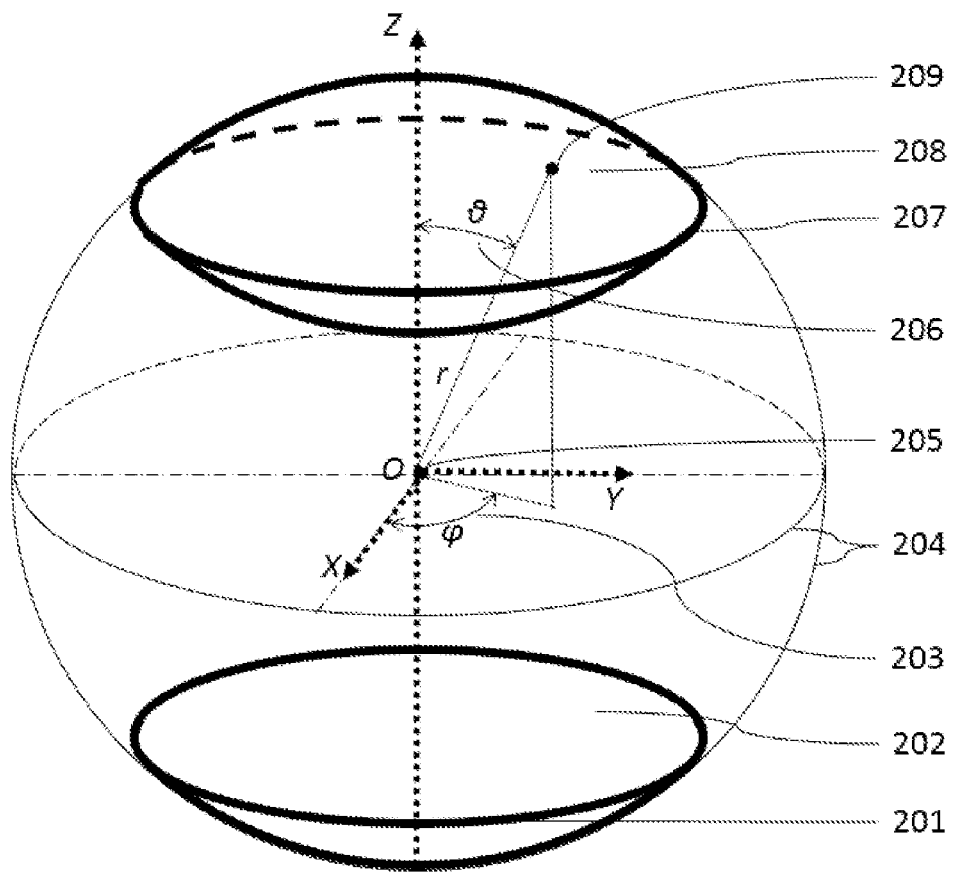
FIG. 2 shows examples of optical components with spherical surfaces which can be inspected according to the present invention.

The present invention provides solutions for inspecting objects with spherical surfaces and surfaces or portions of surfaces which shape may be considered practically spherical. FIG. 2 shows examples of relevant objects for inspection—the mirror 201 with the concave surface 202 and the lens 207 with the convex surface 208. The surfaces 202 and 208 are spherical and can be described as portions of a geometrical sphere 204. In other words, the sphere 204 makes the surfaces 202 and 208. The sphere 204 has a center at the point 205 "O" and the radius "r" of the sphere that is the radius of curvature of surfaces 202 and 208. The purpose of inspection is to identify, classify and determine the locations of features of interest or imperfections on the surfaces 202 and 208. Any location on the inspected surfaces can be described in coordinates of a chosen coordinate system. In a spherical coordinate system, the coordinates of a point 209 may be described as the radius "r", that is constant for a given spherical surface, the azimuth angle 203 "φ" and the polar angle 206 "θ".

Figure 3:
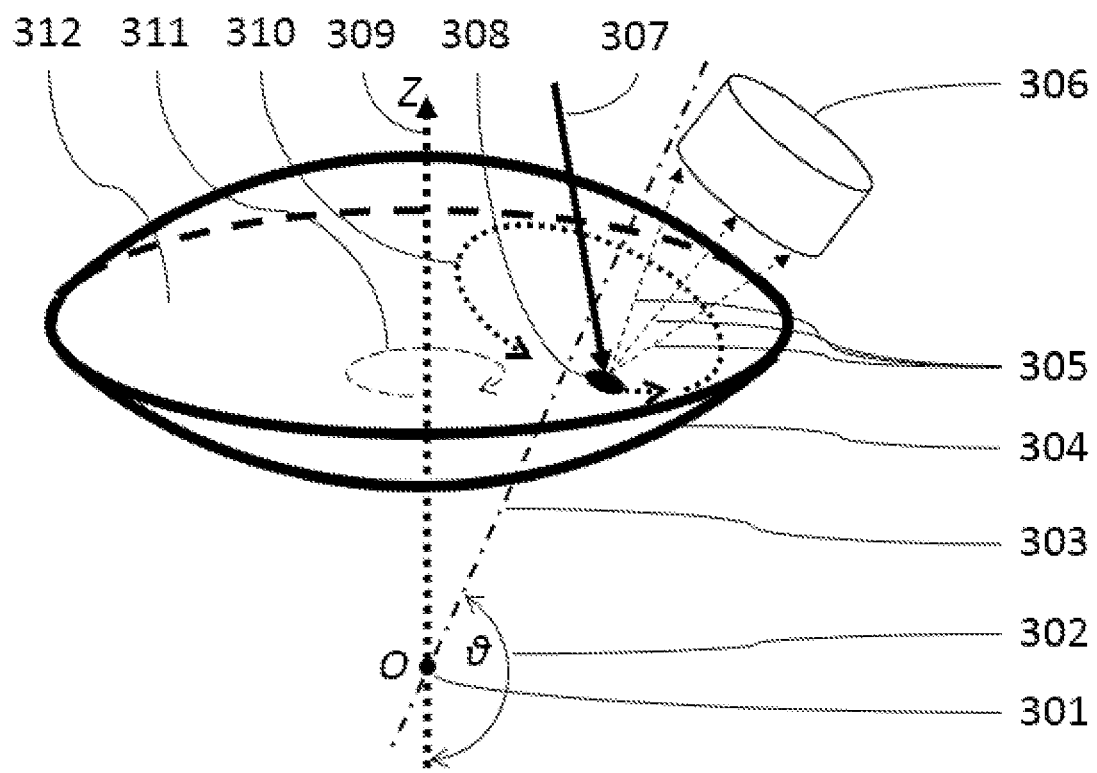
FIG. 3 illustrates an embodiment of the method according to the present invention applied for inspection of an object with a convex spherical surface.

FIG. 3 illustrates an embodiment of the inspection method, according to the present invention. An inspection of a convex spherical surface 312 of the lens 304 is conducted by scanning the surface 312 with the laser beam 307. The laser beam is spun about the spin axis 303 passing through the center 301 of the geometrical sphere making up the inspected surface 312. Therefore, the spin axis 303 is normal to the inspected surface 312. The laser beam illuminates the inspected surface with a spinning beam spot. At every moment of scanning, the beam spot has a specific instantaneous position on the surface 312, for example, the position 308. The laser beam 307 spins counterclockwise in this embodiment and, consequently, the beam spot 308 follows a circular beam spot orbit 310.

Concurrently, the lens 304 is rotated clockwise about its optical axis 309 as shown by the arrow 311. The rotation of the lens 304 provides a relative motion between the lens 304 and the spin axis 303. The same relative motion may be implemented by the rotation of the spin axis 303 about the optical axis 309. The latter can be viewed as a precession of the spin axis 303 about the optical axis 309 with a constant angle 302 "θ". During the entire inspection process, the spin axis 303 is passing through the center 301 of the geometrical sphere making up the inspected surface 312. Both the laser beam spinning and the spin axis rotation 311 with respect to the lens 304 are implemented in a controlled and coordinated way such that instantaneous coordinates of the beam spot 308 on the inspected surface can be determined at any time of inspection.

In the result of the laser beam 307 spinning and the spin axis 303 rotation with respect to the inspected lens 304, the beam spot 308 follows a controlled and predetermined spiral path on the inspected surface 312. The laser radiation 305 scattered on the inspected surface 312 is collected by a collection system 306. The collection system 306 is set in a fixed mechanical relationship with the laser beam 307 and, therefore, it also spins about the spin axis 303. The intensity or power of the scattered radiation 305 is continuously measured. The results of measurements are recorded synchronously with the corresponding instantaneous coordinates of the beam spot 308 on the inspected surface 312. The imperfections on the inspected surface 312 are classified by the intensity of the scattered radiation. In the inspection reports, imperfections, defects or defective areas may be associated with specific coordinates on the inspected surface 312.

Figure 4:
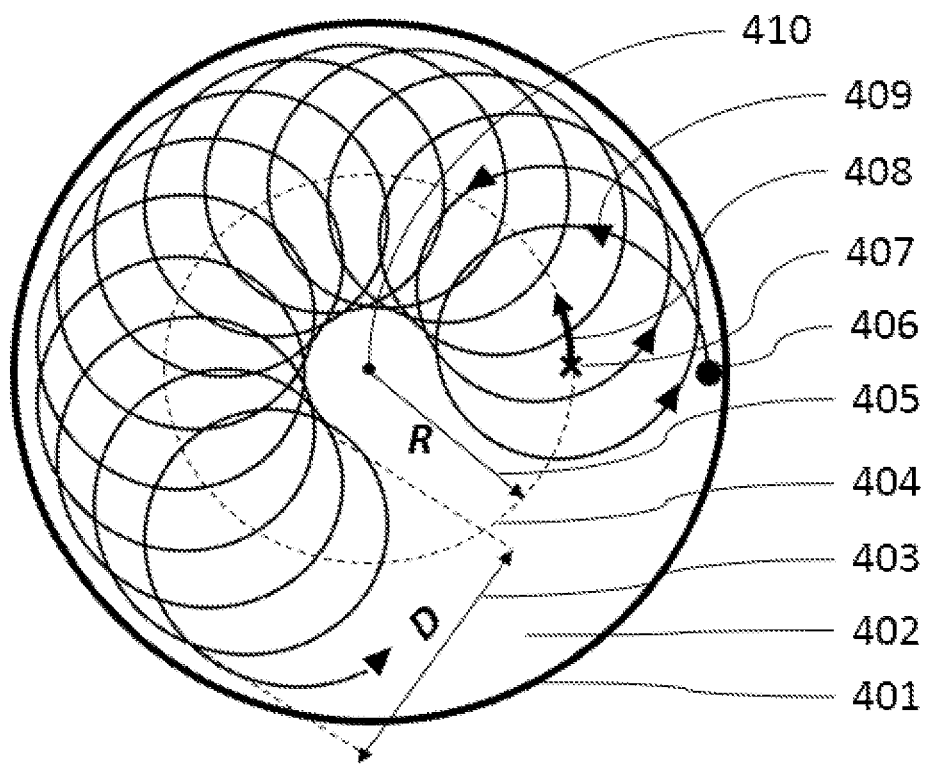
FIG. 4 illustrates a pattern of surface scanning realized in the embodiment of inspection described in FIG. 3.

FIG. 4 illustrates the pattern of the scanning scheme applied for the lens inspection described above in FIG. 3. It shows a schematic top-down view of the surface 402 of the inspected lens 401. The lens 401 has the optical axis 410, its vertical projection on the plane of view is a point. At the initial moment of scanning, the spin axis of the laser beam intersects the lens surface 402 at the point 407, it is marked with a cross in FIG. 4. At the initial moment of scanning, the laser beam illuminates the lens surface 402 with the beam spot 406. With the beginning of scanning, the laser beam starts spinning. Accordingly, the beam spot starts circling counterclockwise along the beam spot orbit 409. Concurrently, the lens begins to turn clockwise about its optical axis 410. As a result, the point of intersection of the axis of laser beam spinning and the lens surface 402 moves along the circle 404 in the counterclockwise direction 408. The circle 404 has the radius 405 "R". As the spin axis turns about the optical axis 410, the beam spot orbit 409 shifts counterclockwise and the beam spot proceeds with scanning the lens surface 402 along the resulting spiral path. The scanning covers a ring having a width 403 "D" that equals the diameter of the beam spot orbit. The speed of laser beam spinning and the speed of spin axis turning around the optical axis 410 are coordinated in accordance with the inspection plan. In particular, to avoid gaps in the scanned area on the inspected surface 402, every other laser beam orbit needs to be shifted along the circle 404 to a distance not larger than the width of the beam spot.

Figure 5:
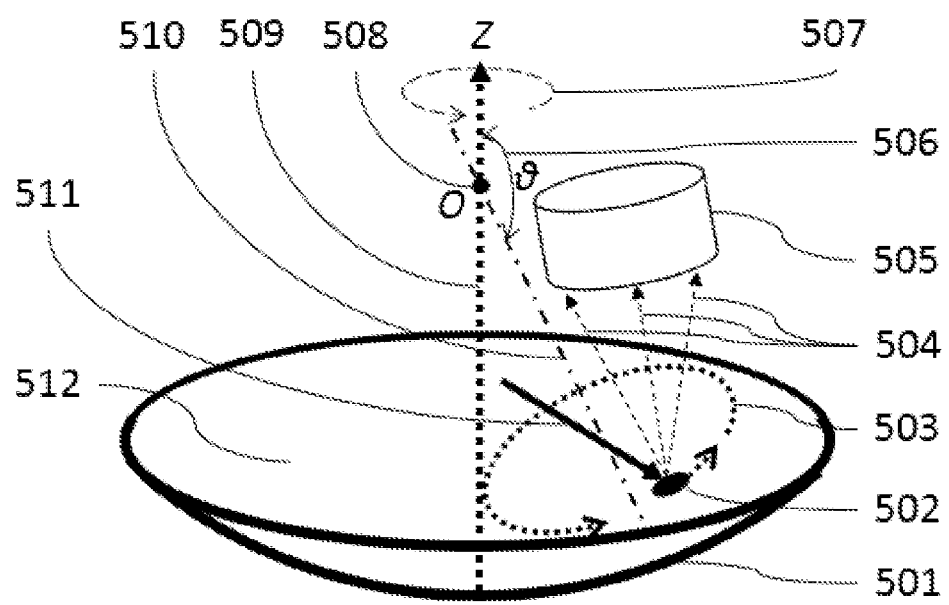
FIG. 5 illustrates an embodiment of the method according to the present invention applied for inspection of an object with a concave spherical surface.

FIG. 5 illustrates an embodiment of the method for inspection of concave surfaces according to the present invention. Inspection of the concave spherical mirror 501 is conducted by scanning over its surface 512 with a laser beam 511. The laser beam is spun about the spin axis 510 that passes through the center 508 of the geometrical sphere making up the inspected surface 512. This means the spin axis 510 is normal to the inspected surface 512. At every instance of scanning, the laser beam illuminates the inspected surface with the moving beam spot 502. Due to the laser beam spinning, the beam spot 502 follows the circular beam spot orbit 503.

Concurrently, the mirror 501 and the spin axis 510 are set in the state of relative motion such that the spin axis 510 rotates with respect to the mirror 501 about the optical axis 509 of the mirror 501 as shown by the arrow 507. Any direction of the rotation may be applied. In FIG. 5 the counterclockwise rotation is chosen. The rotation of the spin axis 510 can be viewed as its precession about the optical axis 509 with a constant azimuth angle 506 "θ".

The required rotation of the spin axis 510 can be achieved by keeping the mirror 501 stationary while moving a system that spins the laser beam 511. Alternatively, the system that spins the laser beam 511 may be kept stationary while the mirror 501 is rotated about its optical axis 509. A clockwise mirror rotation may provide the same relative motion of the spin axis 510 with respect to the mirror 501 as that provided by the counterclockwise rotation 507 of the spin axis 510 about the optical axis 509. It is apparent that a complex motion may be applied that includes simultaneous rotations of the beam spinning system and the inspected mirror.

During the entire inspection process, the spin axis 510 is passing through the center 508 of the geometrical sphere that makes up the inspected surface 512. Both the laser beam spinning and the spin axis rotation with respect to the mirror are implemented in a controlled and coordinated way so that instantaneous coordinates of the beam spot 502 on the inspected surface 512 can be determined at any time of inspection.

In the result of the laser beam spinning and the spin axis rotation with respect to the mirror 501, the beam spot 502 follows a controlled and predetermined spiral path on the inspected surface 512 as illustrated in FIG. 4. The laser radiation 504 scattered on the inspected surface 512 is collected by a collection system 505. The collection system 505 is set in a fixed mechanical relationship with the system that directs the laser beam 511 to the inspected surface 512. Therefore, the collection system 505 also spins about the spin axis 510. The characteristics of the scattered radiation 504, such as intensity or power, are continuously measured. The results of measurements are recorded synchronously with the coordinates of corresponding instantaneous locations of the beam spot 502 on the inspected surface 512. The features and imperfections on the inspected surface influence the scattering of the laser radiation. Therefore, they can be detected and classified by the measured characteristics of the scattered radiation. The specific coordinates of imperfections, defects, defective areas and/or other features on the inspected surface 512 may be determined and reported as a result of the inspection.

As can be seen in the embodiments illustrated in FIG. 3, FIG. 4 and FIG. 5, the conditions of scanning over the inspected spherical surfaces according to the present invention are preserved identical for every instantaneous location of the beam spot on an inspected surface. These identical conditions refer, in particularly, to the angles of the laser beam incidence as well as the position of the collection system and its optical acceptance cone with respect to the beam spot. These are critical prerequisites for providing consistent inspection results and high detectability of features and imperfections on inspected surfaces.

The diameter of a beam spot orbit on the inspected surface in the embodiments illustrated in FIG. 3, FIG. 4 and FIG. 5 is smaller than the half-size or the radius of the inspected surfaces. Accordingly, one revolution of the rotational motion of the spin axis about the optical axis may only provide a scan and inspection of a portion of the inspected surface. This portion of the inspected surface is located within a ring band having a width that equals the diameter of the beam spot orbit. The diameter of the beam spot orbit relates to and is predetermined by the design of an inspection apparatus applied and an apparatus head. In this case, a scanning and inspection of the entire surface may take two or more relative revolutions of the laser spin axis about the axis associated with the inspected object.

Figure 6:
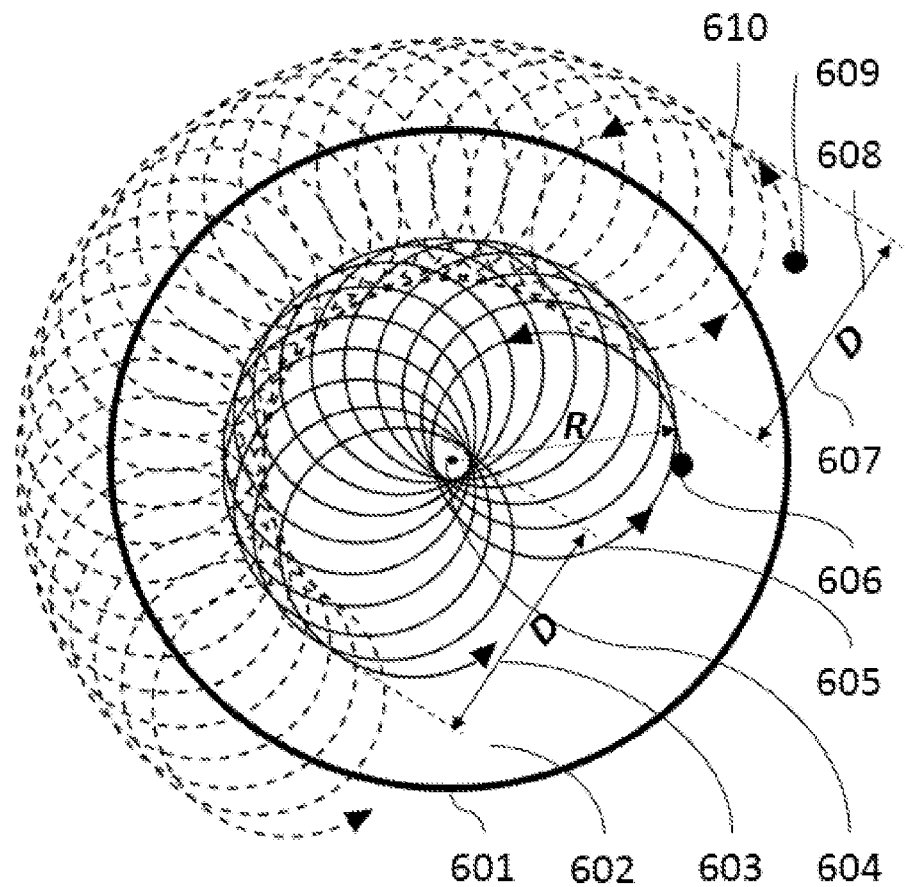
FIG. 6 illustrates an embodiment of object inspection according to the present invention when a laser beam spinning system makes two revolutions about the center of the object, the revolutions are conducted at different distances from the center of the object in order to scan the entire surface of the object.

FIG. 6 illustrates an embodiment of a scan of the entire surface 602 of a concave mirror 601, the radius of which is larger than the diameter 603 "D" of the beam spot orbit. The scanning of the entire surface is executed in two turns or revolutions of the spin axis of a laser beam about the optical axis 604 of the mirror. Note that these revolutions may be conducted by either rotation of the spin axis of the laser beam when the mirror is stationary or by the rotation of the mirror while the spin axis of the laser beam is kept stationary. First, the spinning axis of the laser beam is positioned with respect to the optical axis of the mirror at an azimuth angle θ (see FIG. 5) large enough to ensure that the beam spot orbit touches or encircles the optical axis 604 or, in other words, the center of the mirror. The scanning starts at a beam spot location 606 and, as explained in the description given to FIG. 4, the scanning continues along the spiral path 605. In the process of scanning, the spin axis of the laser beam turns counterclockwise about the optical axis 604. Accordingly, the spiral path of the beam spot shifts around the center of the mirror. The first revolution of the spinning axis of the laser beam about the optical axis provides a complete scan of a central area of the mirror. The central area has a radius equal to the beam spot orbit 603 "D" or smaller depending on whether the orbit touches the center of the mirror or encircles it.

Then spin axis of the laser beam is repositioned with respect to the optical axis of the mirror 601 with reducing the azimuth angle θ (see FIG. 5) such that the beam spot orbit touches or overlaps with the previously scanned area and with the edge of the mirror 601. The scanning continues from the beam spot 609 and proceeds along the spiral path 610 shown by a dash line. This second revolution of the spin axis of the laser beam about the optical axis 604 provides a complete scan of the periphery area of the mirror. The periphery area has a ring shape with a width of the beam spot orbit 608 "D" or smaller depending on overlaps of the beam spot orbit with the central scanned area and the edge of the mirror. The overlaps are determined by the azimuth angle of the spin axis of the laser beam with respect to the optical axis of the mirror. In the result, the entire surface 602 of the mirror is scanned so that a desired objective of the mirror inspection may be achieved. Note that during the whole process of scanning, the spin axis of the laser beam passes through the center of the geometrical sphere that makes up the surface of the mirror.

Figure 7:
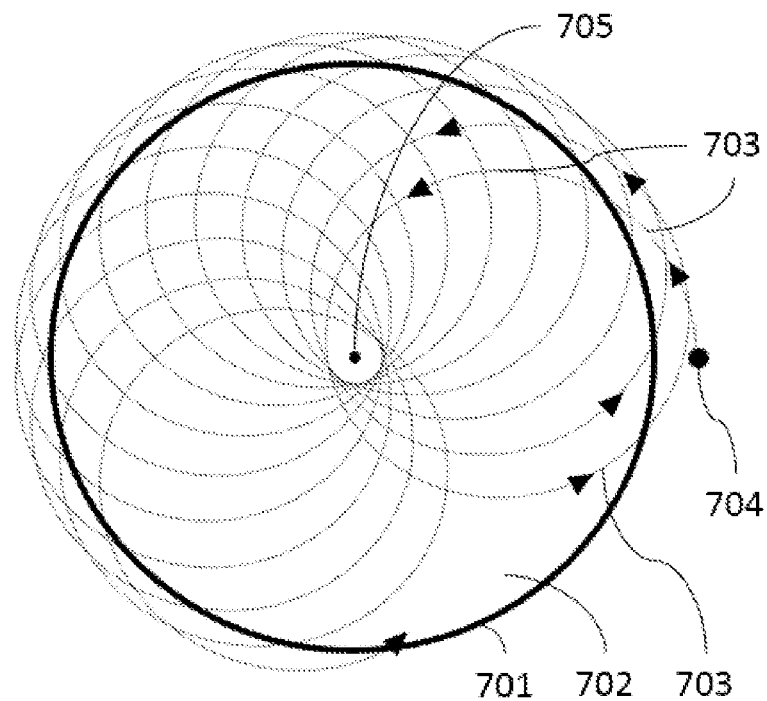
FIG. 7 illustrates an embodiment of object inspection according to the present invention when one revolution of a laser beam spinning system about the center of the object was sufficient to scan the entire surface of the object.

FIG. 7 illustrates an embodiment of a scan of the entire surface 702 of a convex lens 701 according to the present invention in case of using an inspection system with the diameter of a beam spot orbit greater than the radius of the lens. The scan of the entire surface 702 is achieved in one turn or revolution of the spin axis of a laser beam about the optical axis 705 of the lens. This revolution may be conducted by either rotation of the spin axis when the lens is stationary or, preferably, by rotating the lens while the spin axis of the laser beam is kept stationary. The spinning axis of the laser beam is positioned with respect to the optical axis of the lens at an azimuth angle θ (see FIG. 5) ensuring that the beam spot orbit touches or encircles the optical axis 705 and touches or overlaps with the edge of the lens 701. The scanning starts at the beam spot location 704. The location 704 in FIG. 7 is virtual because it is situated outside of the lens 701. The scanning continuous along the spiral path 703. In the process of scanning, the spin axis of the laser beam turns with respect to the lens counterclockwise about the optical axis 705. Accordingly, the spiral path of the beam spot shifts around the center of the lens. One revolution of the laser beam spinning axis about the optical axis 705 completes the scan of the entire surface 702 of the lens 701. During the scan, the spin axis of the laser beam passes through the center of the geometrical sphere that makes up the surface of the lens.

Figure 8:
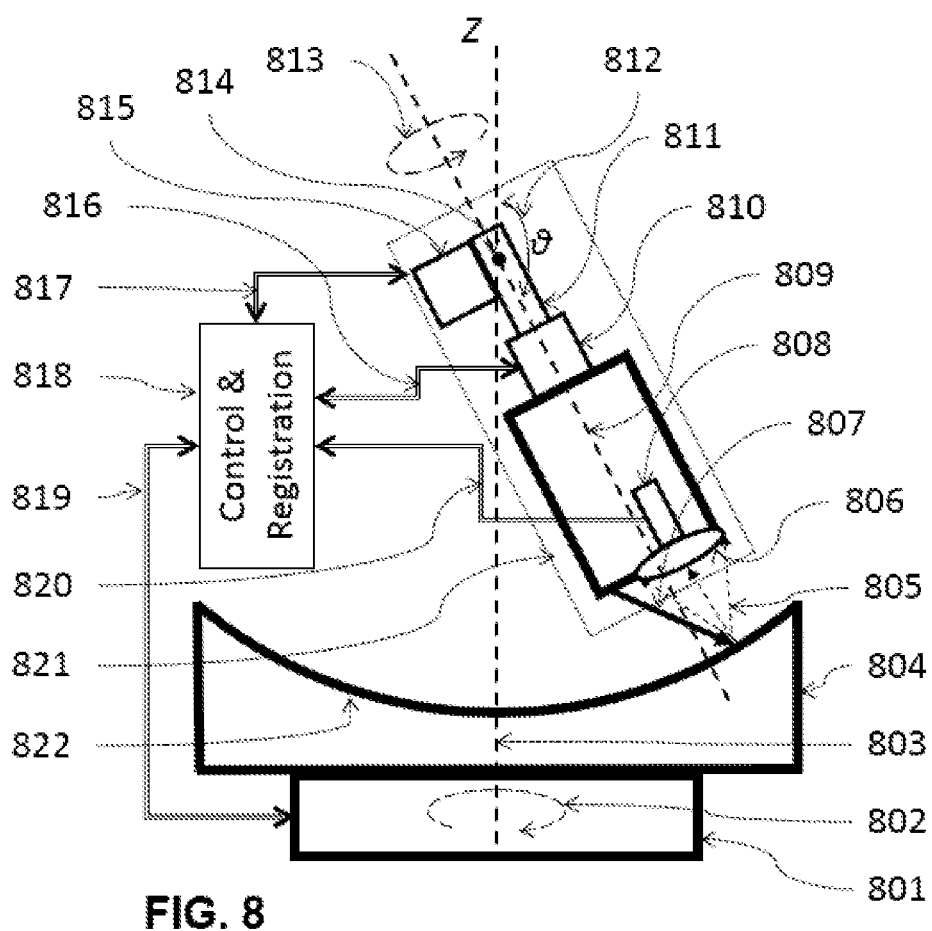
FIG. 8 illustrates an embodiment of an apparatus for inspection of an object with a concave spherical surface according to the present invention.

FIG. 8 illustrates an embodiment of an inspection of a concave spherical surface according to the present invention. The inspected object 804 is held on a rotary table 801 that provides a relatively slow rotational motion 802 of the object 804 about the rotation axis 803. The surface 822 of the inspected object is spherical and concave. If the inspected object is an optical component, its optical axis may coincide with the rotation axis 803. The center of a geometrical sphere that makes up the surface 822 is situated at the center point 814. The rotary table 801 and the inspected object 804 are aligned so that the center point 814 is located on the rotation axis 803.

The head 821 of the inspection apparatus provides the laser beam 807 that may be spun about the spin axis 809 together with the collector 806 of optical radiation. The laser beam 807 is directed towards the surface 822 of the inspected object 804. The collector 806 of optical radiation collects a portion 805 of the laser beam radiation scattered at the surface 822. The head 821 of the inspection apparatus is suspended on the stand 811 above the surface 822. The stand 811 is pinned at the center point 814 and, therefore, the spin axis 809 intersects the rotation axis 803 at the center point 814. Still, the apparatus head 821 may be turned about the center point 814 in the plane of FIG. 8. The angle 812 "θ" between the rotation axis 803 and the spin axis 809 is controlled by the step motor 815 with an encoder so that the apparatus head from the side of the laser beam 807 and the collector 806 may be turned to the areas of the surface 822 closer or father from the rotation axis 803 when desired. Note that this arrangement ensures that the spin axis 809 is always normal to the surface 822 of the inspected object 804.

The angle 812 "θ" is set by a step motor 815 that is controlled by the control and data processing system 818 through the communication channel 817. The motor 815 has an encoder that feeds back the value of the angle 812 to the control and data processing system 818.

The spinning motion 813 of the laser beam 807 with the collector 806 is provided by the servomotor 810 that is controlled by the control and data processing system 818 through the communication channel 816. The servomotor 810 has an encoder that continuously feeds back the angular position of the spinning laser beam 807 to the control and data processing system 818.

The relatively slow rotation 802 of the inspected object 804 about the rotation axis 803 is provided by the rotary table 801 that is also controlled by the control and data processing system 818 through the communication channel 819. The rotary table has an encoder that feeds back the value of the rotation angle to the control and data processing system 818.

The laser radiation scattered at the surface 822 is received by the collector 806 and then transmitted to the photodetector 808. The photodetector 808 measures instantaneous values of the intensity or power of the scattered radiation as the spinning laser beam 807 scans the surface 822. The measured values related to the scattered radiation are continuously provided to the control and data processing system 818 through the communication channel 820.

The distance of the apparatus head 821 from the surface 822 is preferably chosen to provide high efficiency for the collector 806 to receive scattered laser radiation. For every setup of a new object inspection, the control and data processing system 818 is supplied with a value of the radius of the sphere that makes up the surface 822 and with the diameter of the beam spot orbit that is determined by the design of the apparatus head 821 and its distance to the surface 822. These values are constant during the whole inspection process. For every instance of inspection, the control and data processing system 818 receives the data on the angle 812 between the spin axis 809 and the rotation axis 803, the angular position of the spinning laser beam 807 with respect to the spin axis 809, and the rotation angle of the object on the rotary table 801. This data set defines the coordinates of the laser beam spot on the surface 822 of the inspected object 804 at every instance of inspection process. Accordingly, the control and data processing system continuously calculates the coordinates of the laser beam spot on the surface 822 and synchronously associates these coordinates with the measured characteristics of the scattered laser radiation. The result of the overall inspection may be recorded as a relationship between the scattered light intensities and the corresponding locations of the beam spot of the surface 822. The characteristics of the scattered light, such as its intensity, depend on the type and size of surface features. Therefore, the inspection results can be reported as an image of the inspected surface with surface features on it.

The spinning laser beam 807 illuminates the surface 822 with a beam spot that scans the surface 822 along a circular path forming a scanned ring as shown in FIG. 4. If the width of the scanned ring is small, such as less than the radius of the inspected object 804, one revolution of the object 804 provided by the rotary table 801 is insufficient to scan the entire surface 822. In this case, after the first revolution about the rotation axis 803, the angle 812 between the spin axis 809 and rotation axis 803 is changed and the inspection proceeds with another revolution of the object 804 on the rotary table. The inspection with this additional revolution or several more revolutions of the object may be required to inspect the entire surface 822 as described in FIG. 6.

Figure 9:
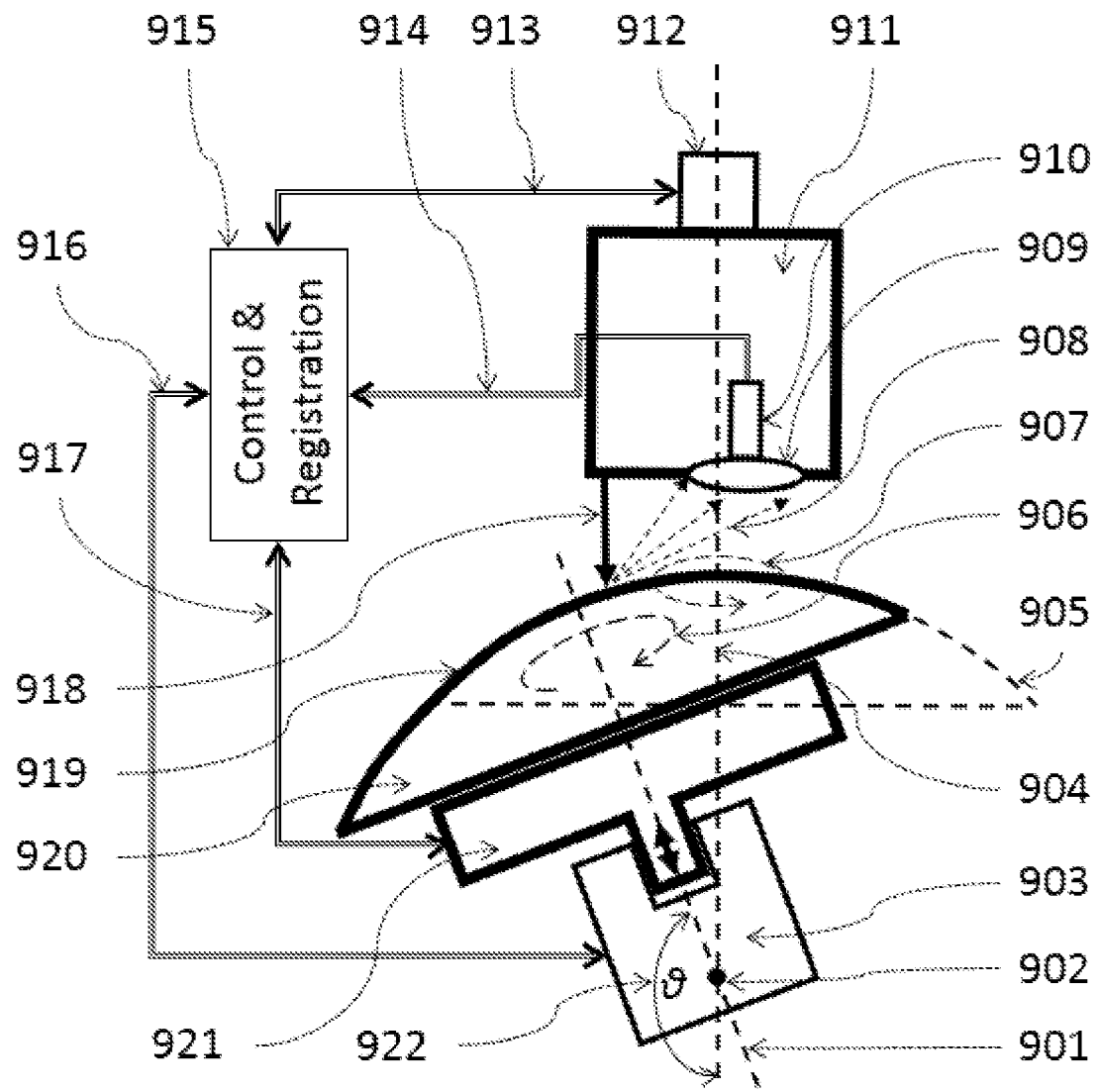
FIG. 9 illustrates an embodiment of an apparatus for inspection of an object with a convex spherical surface according to the present invention.

FIG. 9 illustrates an embodiment of inspection of objects with convex spherical surfaces according to the present invention. The inspected object 920 with the convex spherical surface 919 is held on a rotary table 921 that may provide a relatively slow rotational motion 906 of the object 919 about the rotation axis 901. The center of the geometrical sphere that makes up the surface 919 is located at the center point 902. The inspected object 920 is aligned on the rotary table 921 so that the center point 902 is situated on the rotation axis 901.

The head 911 of the inspection apparatus provides the laser beam 918 that may be spun about the spin axis 904. The collector 909 of scattered optical radiation is mechanically attached to components directing the laser beam 918. Therefore, the collector 909 spins together with the laser beam 918. The laser beam 918 is directed towards the surface 919 of the inspected object 920. The collector 909 of optical radiation collects a portion 908 of the laser beam radiation scattered at the surface 919. The head 911 of the inspection apparatus, excluding its spinning components, is held stationary.

The rotary table 921 is held on the tilting stand 903 that is fastened at the center point 902 and has a degree of freedom to rotate about the center point 902 in the plane of FIG. 9. The fastening with the desired rotational motion is provided by a revolute joint, the axis of the revolute joint crosses the center point 902. Accordingly, the stand 903 with the rotary table 921 and the inspected object 920 can be tilted in a controlled way. The tilting of the stand 903 with respect to the spin axis 904 of spinning components of the apparatus head 911 is automated and driven by a step motor (not shown) of the tilting stand 903. By changing the tilt angle 922 "θ", the inspected object 920 may be moved to a desired position with respect to the apparatus head 911, such as the position 905. The tilting stand 903 and the apparatus head 911 are aligned such that the spin axis 904 crosses the center point 902. Therefore, at any tilt angle 922, the spin axis 904 is normal to the surface 919 of the inspected object 920.

The tilt angle 922 "θ" is the angle between the rotation axis 901 and the spin axis 904. It is precisely controlled so that the apparatus head may be moved closer or father from the rotation axis 901 and face the different areas of the surface 919 as desired. The tilt angle 922 is set by a step motor (not shown) that is controlled by the control and data processing system 915 through the communication cable 916. This motor has an encoder that feeds back the value of the angle 922 to the control and data processing system 915.

The spinning motion 907 of the laser beam 918 and the collector 909 is provided by the motor 912 that is controlled by the control and data processing system 915 through the communication cable 913. The motor 912 has an encoder that continuously feeds back the angular position of the spinning laser beam 918 to the control and data processing system 915.

The relatively slow rotation 906 of the inspected object 920 about the rotation axis 901 is provided by the rotary table 921 that is controlled by the control and data processing system 915 through the communication cable 917. The rotary table has an encoder that feeds back the value of the rotation angle to the data processing system 915.

The laser radiation scattered at the surface 919 is received by the collector 909 and then transmitted to the photodetector 910. The collector 909 is an assembly of optical lenses focusing the rays of laser radiation scattered within the laser beam spot on the surface 919 towards an entry window (not shown) of the photodetector 910. While the spinning laser beam 918 scans the surface 919 of the inspected object 920, the photodetector 910 continuously measures instantaneous values of the intensity of the scattered radiation. The measured values of scattered radiation are continuously fed into the control and data processing system 915 through the communication channel 914.

The distance of the apparatus head 911 from the surface 919 is preferably chosen theoretically or selected experimentally aiming to maximize the amount of scattered laser radiation 908 received by the collector 909. For every new setup for inspection, the control and data processing system 915 is supplied with the radius of the sphere that makes up the surface 919, or the radius of its curvature, and the distance of the apparatus head 911 from the surface 919. The corresponding values are constant for the whole inspection process. For every instance of inspection, the data control and processing system 915 is provided with the value of the angle 922 between the spin axis 904 and the rotation axis 901, the angular position of the spinning laser beam 918 with respect to the spin axis 904, and the rotation angle of the object on the rotary table 921. This data set is sufficient to calculate the positions of the laser beam spot in the coordinate system of the surface 919. Any appropriate coordinate system may be selected for this purpose. Accordingly, the data processing system continuously calculates the coordinates of the laser beam spot on the surface 919 and synchronously associates the measured characteristic of the scattered laser radiation with these coordinates. The results of the overall inspection are recorded in a database as a relationship between the measured characteristics of scattered light and the corresponding locations of the beam spot of the surface 919. The characteristics of the scattered light, such as its intensity or power, depend on the type and size of surface features or defects. Therefore, the inspection results can be imaged as the inspected surface with surface features or defects of different types mapped on this surface.

The spinning laser beam 918 illuminates the surface 919 with a beam spot that scans the surface 919 along a beam spot orbit. If the orbit diameter is large and, in particular, larger than the radius of the inspected object 920, the entire surface 919 can be scanned and inspected during one revolution of the object 920 about the rotation axis 901. If the diameter of the beam spot orbit on the surface 919 is small, two or more revolutions of the object 920 on the rotary table 921 will be required to complete an inspection of the entire surface 919. Every other revolution would need to be implemented by the rotary table 921 at a different tilt angle 922 so that scanned rings would cover the whole surface 919 as explained in FIG. 6.

Figure 10:
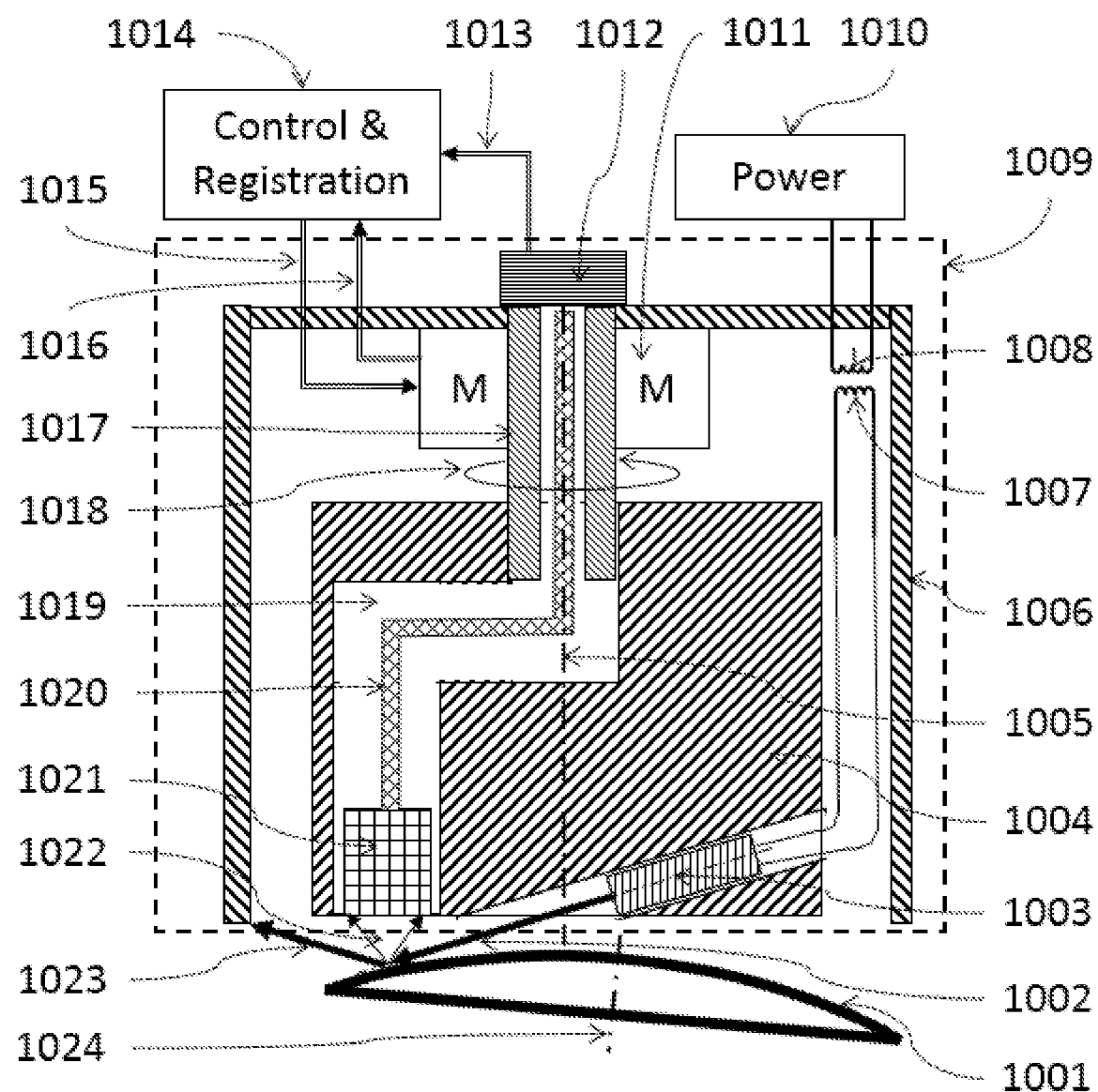
FIG. 10 illustrates an embodiment of a head of the apparatus for inspection of spherical surfaces according to the present invention using a source of laser radiation integrated into the head.

FIG. 10 illustrates an embodiment of an apparatus for inspection of spherical surfaces according to the present invention and, specifically, the apparatus head 1009. A spherical surface 1001 of a workpiece, such as an optical lens or a mirror, is inspected. The workpiece is supported by a table (not shown) that is capable of providing relatively slow motions described above in the association with FIG. 8 and/or FIG. 9. In particular, the table may rotate the workpiece about the axis 1024 that passes through the center of curvature of the spherical surface 1001. The surface 1001 is illuminated with the laser beam 1002 provided by the laser module 1003. The laser beam 1002 interacts with the surface 1001 and sub-surface areas of the workpiece resulting in the reflected beam 1023 and the scattered light 1022. The reflected beam 1023 is terminated by the housing walls 1006 of the apparatus head 1009. Optionally, the reflected beam 1023 may be terminated with a specifically designed damp that may be attached to the beam directing platform 1004. Instead of being terminated, the reflected beam 1023 may also be measured and the results of those measurements may be used in the analysis pertinent to the inspection. A portion of the scattered light 1022 is collected by the light collector 1021 and then passed by the light transmitter 1020 to the photodetector 1012. The photodetector 1012 measures the intensity of the scattered light 1022. The results of the measurements are conveyed through the communication cable 1013 to the control and data processing system 1014.

The laser module 1003 and the light collector 1021 are imbedded into and held by the beam directing platform 1004. The beam directing platform 1004 is attached to the hollow shaft 1017 of the electrical motor 1011 that may be a servomotor or a step motor. The data processing system 1014 controls the motor spinning through the communication cable 1015. The motor 1011 is equipped with an encoder that feeds back the angular position of motor shaft turning to the control and data processing system 1014 through the communication cable 1016. The motor 1011 spins the hollow shaft 1017 and the beam directing platform 1004. Accordingly, the laser module 1003, the light collector 1021 and the light transmitter 1020 are set in spinning motion 1018 about the spin axis 1005. The light transmitter 1020 is positioned within the beam directing platform 1004. The light transmitter 1020 faces the light collector 1021 on one end, then it goes through the passage 1019 in the beam directing platform 1004, passes through the motor shaft 1017 and faces the photodetector 1012 on the other end. The laser module 1003 is wirelessly powered by the power supply unit 1010 through an inductive coupling comprised of the supplying induction coil 1008 and the receiving induction coil 1007, the coils form an electrical transformer. Stationary components of the apparatus head 1009 include the housing 1006, the motor 1011 and the photodetector 1012. The spinning components of the apparatus head 1009 include the motor shaft 1017 with the beam directing platform 1004, the laser module 1003, the receiving induction coil 1007, the light collector 1021 and the light transmitter 1020. The term "platform" with the reference to the "beam directing platform" denotes any means or fixtures, such as rods, bars, disks and fasteners, which can be used to arrange a laser module, a light collector and a light transmitted in a fixed relationship with a spinning shaft of a scanner.

Figure 11:
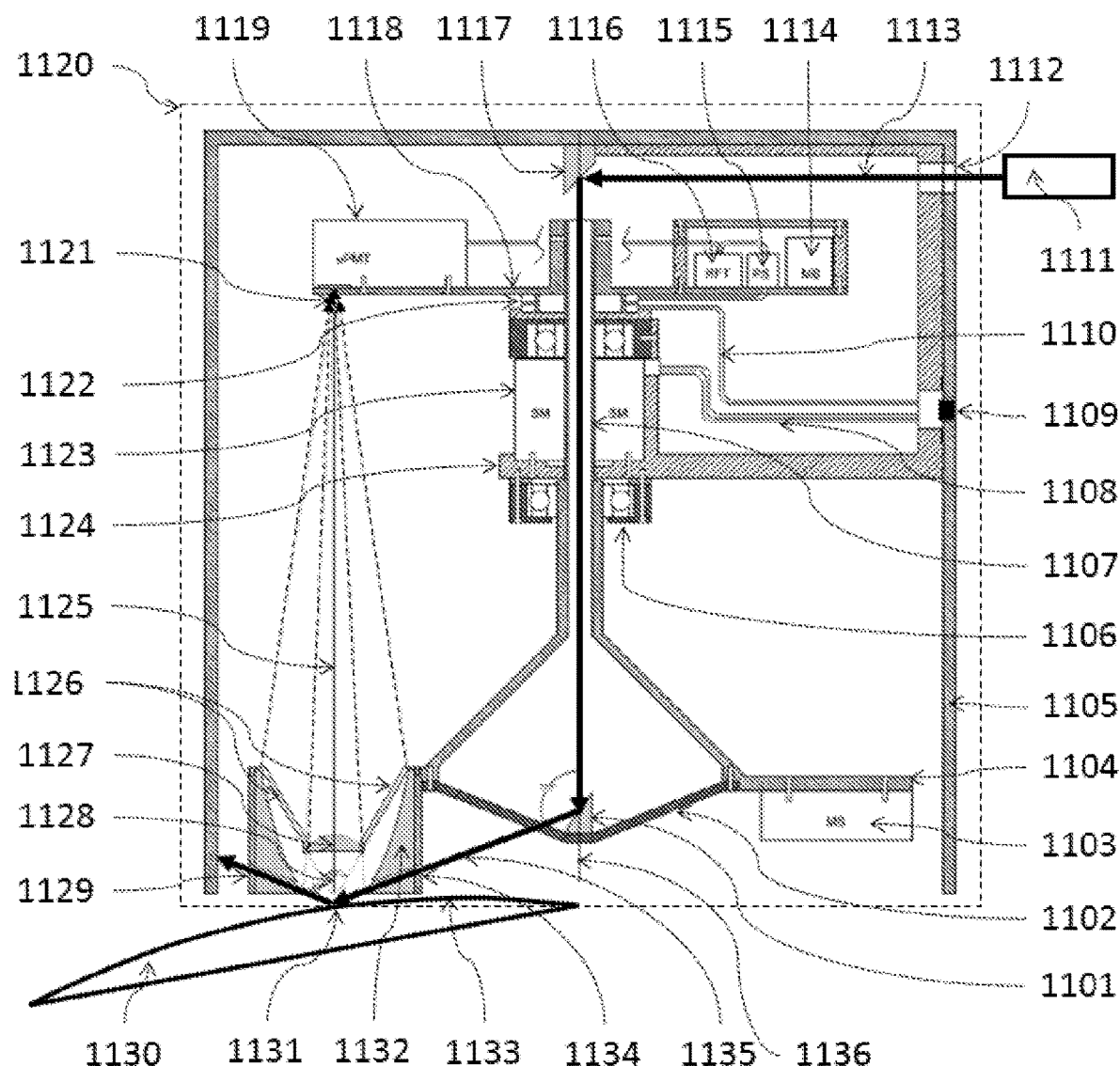
FIG. 11 illustrates an embodiment of a head of the apparatus for inspection of spherical surfaces according to the present invention using an external source of laser radiation.

FIG. 11 illustrates another embodiment of the apparatus for inspection of spherical surfaces according to the present invention. The apparatus head 1120 is enclosed in the housing 1105. The stationary components of the apparatus head 1120 include the housing 1105, the mirror 1117, and the motor 1123 suspended on the bracket 1124 attached to the housing 1105. The spinning components of the apparatus head 1120 include the hollow shaft 1107 of the motor 1123, the beam directing platform 1104 and the platform 1118 of electronic components. The platforms 1104 and 1118 are affixed to the hollow shaft 1107 that drives their spinning during an inspection process. The beam directing platform 1104 holds and carries a collector of scattered light, the balancing weight 1103 for preventing vibrations when the beam directing platform 1104 spins, and a mirror 1101 sitting on the cap 1102 attached to the bottom of the beam directing platform 1104. The collector of scattered light is built of the ellipsoidal mirror 1132 attached to the platform 1104 and the lens 1127 suspended on the platform 1104 with several fasteners 1126. The platform 1118 of electronic components carries the photodetector 1119, the power converter 1115, the RF transmitter 1116, and the balancing weight 1114 for preventing vibrations when the platform 1118 spins. The inductive coupling system 1122 is used to supply electric power from an external source of power to the devices on the spinning platform 1118 of electronic components. The inductive coupling system 1122 includes a receiving coil, which is attached to the bottom of the platform 1118 of electronic components, and a supplying coil attached to the motor 1123.

The external source 1111 of a DUV radiation provides a laser beam 1113 that enters into the apparatus head 1120 through the window 1112 in the housing 1105. The laser beam 1113 is reflected by the mirror 1117 along the spin axis 1136 of the hollow shaft 1107. Following the hollow shaft 1107, the laser beam hits the mirror 1101. Then, the laser beam 1135 reflects at the mirror 1101, passes through the first side window 1134 in the ellipsoidal mirror 1132 and illuminates an inspected object.

The inspected optical component 1130 shown in FIG. 11 is a lens or a mirror with a spherical surface 1133. It is illuminated by the laser beam 1135 within an area of the beam spot 1131. A portion of the laser beam is reflected at the surface of the inspected object 1132 and exits the collector of scattered light through the second side window 1129 in the ellipsoidal mirror 1132. Then, the reflected portion of the laser beam is dumped on the inner surface of the head housing 1105. The rays 1128 of the laser beam scattered on the surface 1133 of the inspected object 1130 at the beam spot 1131 reach the components of the collector of scattered light. The lens 1127 and the ellipsoidal mirror 1132 of the scattered light collector are aligned such that they have the same optical axis 1125. Those rays of light scattered in the direction closer to the optical axis 1125 are collected by the lens 1127 and then transmitted along the optical axis 1125 towards the photodetector 1119. The rays of the light scattered at larger angles with respect to the optical axis 1125 are collected by the ellipsoidal mirror 1132 and also transmitted along the optical axis 1125 towards the photodetector 1119. All collected rays of scattered light are focused at the entry window 1121 of the photodetector 1119. This is achieved by selecting the lens 1127 with an appropriate focal length and selecting the ellipsoidal mirror 1132 with appropriate focal points. The collection of scattered light and its transmission to the photodetector 1119 may be interpreted as imaging the beam spot 1131 at the entry window 1121 of the photodetector 1119. The collector of scattered light is designed and its optical components are selected accordingly the described function, that is a trivial task for those skilled in optics. Adding conventional optical filters (not shown) for collected scattered light on its path to the photodetector 1119 provides a known improvements of functions and performance of the inspection apparatus. For example, a pinhole aperture at the focal point of the scattered light collector, near the entry window 1121 of the photodetector 1119, increases the resolution of the inspection apparatus. The inspected object 1130 is held on a table (not shown) that rotates the optical component 1130 about its optical axis. The rotation provides a relative motion of the optical component with respect to the spin axis 1136 of the apparatus head 1120 as explained above in the descriptions associated with FIG. 8 and/or FIG. 9.

Electrical modules of the apparatus head 1120 are powered from external power supply devices (not shown) through the multi-pin connector 1109. The wire cable 1110 connects the supplying coil of the inductive coupling system 1122 to an AC power supply device. The power transmitted to the receiving coil attached to the platform 1118 is adapted by the power converter 1115 to supply the photodetector 1119 and RF transmitter 1116 with electrical power at appropriate DC voltages. Multi-wire cable 1108 includes wires connecting the motor 1123 to a controlled voltage supply device. This enables motor 1123 to spin the hollow shaft 1107 with the beam directing platform 1104 and the platform 1118 of electronic components. Accordingly, the laser beam 1135, the lens 1127 and the ellipsoidal mirror 1132 of the light collector as well as the photodetector 1119 and other components on the platform 1118 are set in spinning motion about the spin axis 1136. The bearings 1106 support the spinning platforms 1104 and 1118 and provide their overall alignment and stability at spinning.

The photodetector 1119 measures the intensity of the scattered light at the beam spot 1131 on the inspected surface 1133. The results of these measurements are continuously conveyed by wires on the platform 1118 to the RF transmitter 1116 that wirelessly transmits these results to a control and data processing system (not shown). Concurrently, the data processing system receives data on the angular position of the laser beam 1135 that spins. This data is continuously transmitted from an encoder of the motor 1123 through dedicated wires included in the multi-wire cable 1108 and the multi-pin connector 1109. A means that provides a relative motion of the inspected optical component 1130 with respect to the spin axis 1136 also feeds the information about the angle of rotation to the data processing system. All the data received by the data processing system is synchronously analyzed so that instantaneous coordinates of the beam spot 1131 on the inspected surface 1133 are determined and associated with the intensity of the scattered light. Finally, the result of the overall inspection are recorded as a relationship between the scattered light intensities and the corresponding locations of the beam spot of the inspected surface. The scattered light intensity is preferably correlated to the type and size of surface features so that the inspection results can be reported as an image or map of surface features of different types and sizes on the inspected surface.

Figure 12:
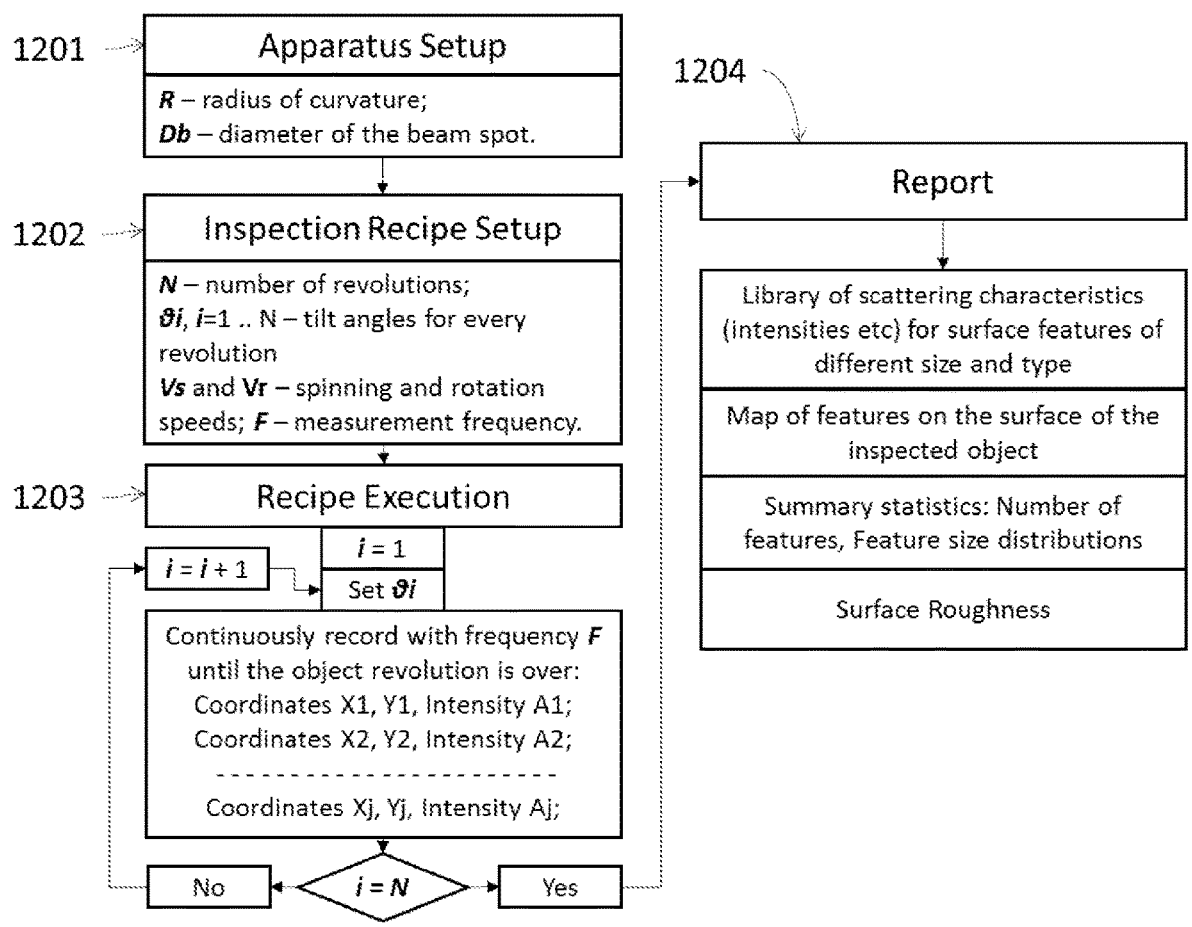
FIG. 12 shows an embodiment of a flowchart of an inspection process according to the present invention.

FIG. 12 shows a flowchart of an inspection process described in FIG. 9. The apparatus setup 1201 before the inspection includes the following steps:

Receive the object 920 with the convex spherical surface 919 for inspection.

Obtain or measure the radius R of the curvature of the surface 919 that is the radius of the geometrical sphere making up the surface 919.

Place the object 919 on the rotary table 921.

Set the tilting stand 903 at the tilt angle 922 $\theta=180°$, the rotation axis 901 becomes vertical.

Center the object 919 on the rotary table 921 so that the center point 902 of the sphere making up the object surface 919 is on the rotation axis 901.

By vertical displacement of the rotary table 921 set the distance from the surface 919 to the revolute joint, that fastens the tilting stand 903, to the radius R of the surface 919 curvature.

Center the apparatus head 911 to superpose the spin axis 904 with the rotation axis 901 such that these axes coincide.

By vertical displacement of the apparatus head 911 set its distance from the surface 919 to a specified value that is predetermined by the apparatus head design (see the descriptions of the head designs depicted in FIG. 10 and FIG. 11).

The inspection recipe setup 1202 before the inspection includes the following steps:

Determine the number N of revolutions of inspected object 920 about the rotation axis needed to inspect the entire surface 919 (see the explanation given in FIG. 6 and the associated description).

Determine the tilt angle(s) 922 θ for every revolution and enter the sequence and values of the tilt angles in the Control and Data Processing System 915.

In the Control and Data Processing System 915, enter the desired speed Vs of the laser beam spinning 907 and the speed Vr of the object rotation 906 for inspection. The preferred relationship between Vr (rpm) and Vs (rpm) established by the authors of the present invention is $Vr/Vs \leq 0.16 \cdot Db/[R \cdot \sin(\theta)]$.

where Db is the diameter or width of the laser beam spot on the inspected surface.

In the Control and Data Processing System 915, enter a desired frequency for measurements of the scattered laser radiation and instantaneous coordinates of the beam spot. The preferred frequency F established by the authors of the present invention is $F(Hz) \geq 0.1 \cdot Ds \cdot Vs/Db$, where Ds is the distance from the beam spot on an inspected surface to the spin axis, Ds is defined by the design of the apparatus head used.

For example, a convex mirror is inspected. The apparatus head provides a laser beam with a beam spot diameter on the inspected surface Db=0.15 mm. The surface has the radius of curvature R=200 mm, the determined tilt angle θ=165°, the speed of laser beam spinning Vs=1600 rpm and the distance from the beam spot on the inspected surface to the spin axis Ds=120 mm. Then, the recommended speed of object rotation at inspection is $Vr \leq Vs \cdot 0.16 \cdot Db/[R \cdot \sin(\theta)] = 1600 \cdot 0.16 \cdot 0.15/[200 \cdot \sin(165°)] = 0.74 rpm$.

A specific rotation speed Vr=0.5 rpm is selected for inspection.

The recommended frequency of measurements and data collection is $F \geq 0.1 \cdot Ds \cdot Vs/Db = 0.1 \cdot 120 \cdot 1600/0.15 = 128,000 Hz$.

A specific measurement frequency F=150 KHz is selected.

The execution 1203 of the inspection recipe is controlled and governed by the Control and Data Processing System 915 in the following sequence:

Set the tilt angle 922 to the first specified position;
Start the spinning of the laser and collector components of the apparatus head 911 about the axis 904;
Turn on the laser power;
Turn on the photodetector 910;
Start the rotation of the object 920 about the axis 901;
Start registering the inspection data—with the specified frequency F—measure, calculate and record the characteristic of the scattered laser radiation (e.g. its intensity) and the corresponding instantaneous coordinates of the beam spot on the inspected surface 919.
Repeat the previous sequence at the next tilt angle(s) 922 if specified in the recipe setup 1202;
Turn off the laser power and the photodetector 910;
Stop the rotation of the inspected object and the spinning of laser beam directing platform in the apparatus head.

The report 1204 the results of inspection includes:
The map of the inspected surface 919 with identified defects of different types and sizes;
Summary statistics of detected surface defects—quantity, size distributions, etc.;
Overall surface roughness.

This is essential in the method and apparatus according to the present invention, that an inspected surface is scanned in the result of a convoluted combination of two motions. The first motion is a probing beam spinning. The second motion is a repositioning of the spin axis with respect to the inspected surface. A preferred option for the second motion is a rotation of the inspected surface about a rotation axis or an axial rotation of the inspected object because a rotation about an axis is the simplest, most precise and highly controllable type of mechanical motions. However, the benefits of the present invention may also be realized by applying other alternatives for the second motion such as a precession or a circular motion of the spin axis about an inspected surface. Another example of an acceptable type for the second motion is tilting of the inspected surface with respect to the spin axis. In all cases, the first and the second motions need to meet two criteria—the spin axis should be normal to the inspected surface and the distance from the spinning components of the apparatus head to the inspected surface should be preserved constant during inspection. In general, these criteria are satisfied when the spin axis passes through the center of curvature of the inspected surface and the inspected surface is pinned in its center of curvature so it may only be rotated about its center of curvature.

As it follows from the previous description, the design of analyzers according to the present invention enables apparatus implementation in uniquely compact forms portable into equipment units. Therefore, the apparatus according to the present invention may be deployed and used for in-situ inspection of manufactured workpieces and products. This may be beneficial for controlling production processes, ensuring quality of products, enhancing manufacturing productivity and reducing production cost.

A significant number of workpiece quality parameters and causes of equipment malfunction correlate to degradations of workpiece and equipment surfaces. Therefore, this may be desirable to integrate the surface inspection with the manufacturing equipment and realize a capability of production equipment to conduct a self-diagnostic of its health and indicate needs for proactive maintenance. This may be highly valuable for reducing production scrap, minimizing repair downtime and enhancing the overall equipment efficiency. In a preferred embodiment, equipment diagnostic may be conducted based on an inspection of workpieces being processed. In another preferred embodiment, this may be advantageous to inspect a test or witness workpiece with a known original surface quality. To ensure that the results of surface inspection are relevant, a test workpiece may preferably be exposed to the same minienvironment as processed workpieces and may be transported along the same paths within equipment as processed workpieces.

Choosing a type of electromagnetic radiation for the probing beam to conduct an inspection according to the present invention depends on a particular application of the inspection. For example, inspection of an optical component may better be conducted with a probing beam of optical radiation of about the same wavelength as the optical component is designed for. Typical industrial optical applications are conducted with the infrared, visible light, ultraviolet, deep ultraviolet and extreme ultraviolet radiations. The corresponding wavelengths belong to the interval from 10 nm to 3000 nm.

The probing beam of electromagnetic radiation in an inspection according to the present invention may be directed onto an inspected surface a different angles. The choice of the angle depends on particular objectives of the inspection. One option is the zero angle of incidence that corresponds to an illumination normal, or perpendicular, to the inspected surface. It provides higher tolerance of the inspection accuracy to variations of the distance of the apparatus head to the inspected surface. Such variation may be inevitable at inspection of surfaces which deviate from spherical shapes. According to experiments conducted by inventors, the best detectability or sensitivity of the inspection to surface defects may be achieved at the angles of probing beam incidence within the interval from 40 to 80 degrees.

The performance of the optical module for collecting the scattered electromagnetic radiation in the apparatus according to the present invention depends on the choice of its optical component. Lenses are less expensive and easier to assemble and tune to satisfy the intended function of radiation collection and transfer to a photodetector. Using ellipsoidal or a parabolic mirrors with reflecting inner surfaces of revolution improves the efficiency of scattered radiation collection because of increased acceptance angles for the rays of scattered radiation. In this way, the detectability of smaller imperfections on inspected surfaces may be enhanced. However, such mirrors are more expensive and require high precision alignments in the assemblies of optical modules.

Highly robust solutions for the apparatus according to the present invention may be based on using sources of probing beams integrated into the apparatus heads. Such module should be preferably small and not heavy. These criteria may practically limit the choice of sources of electromagnetic radiation with devices such as visible and ultraviolet laser modules having relatively low power. In order to provide the highest detectability of nanoscale imperfections on inspected surfaces, this may be desired to use external sources of electromagnetic radiation which may provide probing beams of higher power and shorter wavelengths.

The apparatus for inspection of spherical surfaces disclosed in the present invention is a complex system comprising many components that interact mechanically, optically and electrically in an intricate and coordinated manner. Some of those components are conventional and are not explained in detail in the present description because they have various appropriate and readily available solutions and related products on the market. For those skilled in electronics, automation or robotics, this would be a standard task to select and integrate controlling, communicating and recording components according to the functions described in the present invention. For those skilled in the field of mechanical engineering, this is a trivial task to select or manufacture mechanical and optical components, assemble them into an apparatus according to the present invention and achieve the benefits of the present invention. Numerous specific implementations of the disclosed apparatus may exist. Examples given the present description provide particular solutions and do not intend to limit the scope of the invention.

What is claimed is:

1. A method for inspection of spherical surfaces, the method comprises:
   providing an object with a spherical or curved surface for inspection,
   scanning the surface with a probing beam of electromagnetic radiation, the probing beam is directed onto the surface for inspection and illuminates the surface for inspection with a beam spot, the electromagnetic radiation of the probing beam scatters at the surface within the area of the beam spot and produces scattered electromagnetic radiation,
   dynamically determining instantaneous coordinates of the beam spot on the surface for inspection,
   dynamically measuring characteristic parameters of the scattered electromagnetic radiation,
   and synchronously recording the measured values of the characteristic parameters of the scattered electromagnetic radiation and the instantaneous coordinates of the beam spot at which the characteristic parameters of the scattered electromagnetic radiation are measured,
   wherein
   the scanning is implemented by a combination of motions including a first motion and a second motion,
   the first motion is a spinning of the probing beam of electromagnetic radiation about a spin axis,
   the second motion is a repositioning of the spin axis with respect to the surface for inspection,
   the spin axis is maintained perpendicular to the surface for inspection, and
   the probing beam is directed onto the surface for inspection at a distance from the spin axis.

2. The method for inspection of spherical surfaces of claim 1, wherein
   the instantaneous coordinates of the beam spot on the surface for inspection are determined and characteristic parameters of the scattered electromagnetic radiation are measured dynamically with the frequency (in Hz) not less than $0.1 \cdot Ds \cdot Vs/Db$, where Ds is the distance at which the probing beam is directed onto the surface for inspection from the spin axis, Vs is the speed of the probing beam spinning (in rpm) and Db is the width of the beam spot.

3. The method for inspection of spherical surfaces of claim 1, wherein
   the electromagnetic radiation of the probing beam has a wavelength in the range from 10 nm to 3000 nm.

4. The method for inspection of spherical surfaces of claim 1, wherein
   the probing beam of electromagnetic radiation is directed perpendicular onto the surface for inspection.

5. The method for inspection of spherical surfaces of claim 1, wherein
   the probing beam of electromagnetic radiation is directed onto the surface for inspection at the angle of incidence from 40 to 80 degrees.

6. The method for inspection of spherical surfaces of claim 1, wherein
   the second motion includes a rotation of the object about a rotation axis,
   the object is aligned with the rotation axis so that the center of curvature of the surface for inspection is on the rotation axis and
   the spin axis is positioned not to coincide with the rotation axis.

7. The method for inspection of spherical surfaces of claim 6, wherein
   the surface for inspection is concave,
   the rotation axis is maintained stationary and
   the second motion includes a tilting of the spin axis with respect to the rotation axis.

8. The method for inspection of spherical surfaces of claim 6, wherein
   the surface for inspection is convex,
   the spin axis is maintained stationary and
   and the second motion includes a tilting of the rotation axis with respect to the spin axis.

9. The method for inspection of spherical surfaces of claim 6, wherein
   the speed of object rotation (in rpm) is less than $0.16 \cdot Vs \cdot Db/[R \cdot \sin(\theta)]$, where Vs is the speed of spinning of the probing beam (in rpm), Db is the width of the beam spot, R is the radius of curvature of the surface for inspection and θ is the angle of between the rotation axis and the spin axis.

10. The method for inspection of spherical surfaces of claim 1, wherein the object with a spherical or curved surface for inspection is an optical component.

11. An apparatus for inspection of spherical surfaces, the apparatus comprises
a first stand for holding an object with a spherical surface or curved surface for inspection,
an apparatus head,
a second stand for holding the apparatus head,
and an electronic control and data processing system, wherein
the first stand includes a rotary table configured to rotate the object about a rotation axis and to align the object such that the center of curvature of the surface for inspection is on the rotation axis,
the apparatus head is configured to illuminate the surface for inspection with a beam of electromagnetic radiation that spins about a spin axis and to measure the electromagnetic radiation scattered on the surface for inspection,
the second stand holds the apparatus head in front of the surface for inspection and directs the spin axis perpendicular to the surface for inspection so that the beam of electromagnetic radiation illuminates the surface for inspection with a spinning beam spot, and
the electronic control and data processing system continuously obtains the first stream of data about the angular position of the spinning beam spot with respect to the spin axis, obtains the second stream of data about the angle of rotation of the object on the rotary table, obtains the third stream of data about the measured characteristic parameters of the radiation scattered on the surface for inspection, determines instantaneous coordinates of the beam spot on the surface for inspection based on the information in the first stream of data and the second stream of data, and synchronously records the data about the measured radiation scattered on the surface for inspection and the corresponding instantaneous coordinates of the beam spot on the surface for inspection.

12. The apparatus for inspection of spherical surfaces of claim 11, wherein
the apparatus head comprises a hollow shaft configured for spinning about the spin axis, a motor configured to spin the hollow shaft, a source of electromagnetic radiation affixed to the hollow shaft, a wireless power transmitter that powers the source of electromagnetic radiation, an optical module affixed to the hollow shaft and a photodetector mechanically decoupled from the hollow shaft,
the surface for inspection is illuminated with the beam of electromagnetic radiation that is provided by the source of electromagnetic radiation spinning with the hollow shaft about the spin axis,
the entry window of the photodetector faces the hole in the hollow shaft and is centered with the spin axis,
the optical module collects the electromagnetic radiation scattered on the surface for inspection and conveys the collected radiation through the hollow shaft to the entry window of the photodetector and
the electromagnetic radiation scattered on the surface for inspection is measured by the photodetector.

13. The apparatus for inspection of spherical surfaces of claim 11, wherein
the beam of electromagnetic radiation is provided by an external source of electromagnetic radiation,
the apparatus head comprises a hollow shaft configured for spinning about the spin axis, a motor configured to spin the hollow shaft, a photodetector mechanically affixed to the hollow shaft, a wireless data transmitter mechanically affixed to the hollow shaft, a wireless power transmitter that powers the photodetector and the wireless data transmitter, an optical module mechanically affixed to the hollow shaft and a mirror affixed to the hollow shaft and arranged to face the hole in the hollow shaft from the side of the surface for inspection,
the surface for inspection is illuminated with the beam of electromagnetic radiation that is guided from the external source of electromagnetic radiation through the hollow shaft in the direction towards the surface for inspection to the mirror affixed to the hollow shaft, the mirror directs the beam of electromagnetic radiation onto the surface for inspection,
the optical module collects the electromagnetic radiation scattered on the surface for inspection and conveys the collected radiation to the entry window of the photodetector,
the electromagnetic radiation scattered on the surface for inspection is measured by the photodetector and
the wireless data transmitter provides the third stream of data from the photodetector to the electronic control and data processing system.

14. The apparatus for inspection of spherical surfaces of claim 11, wherein
the apparatus is used for inspection of a concave spherical surface,
the first stand secures a stationary position for the rotation axis and
the second stand is fastened at the center of curvature of the surface for inspection and may be tilted about the center of curvature of the surface for inspection.

15. The apparatus for inspection of spherical surfaces of claim 11, wherein
the apparatus is used for inspection of a convex spherical surface,
the first stand is fastened at the center of curvature of the surface for inspection and may be tilted about the center of curvature of the surface for inspection and
the second stand secures a stationary position for the spin axis.

16. The apparatus for inspection of spherical surfaces of claim 11, wherein
the electromagnetic radiation scattered on the surface for inspection is collected for measurements by an optical module comprising an optical lens.

17. The apparatus for inspection of spherical surfaces of claim 11, wherein
the electromagnetic radiation scattered on the surface for inspection is collected for measurements by an optical module comprising a parabolic mirror.

18. The apparatus for inspection of spherical surfaces of claim 11, wherein
the electromagnetic radiation scattered on the surface for inspection is conveyed for measurements through an optical fiber cable.

19. The apparatus for inspection of spherical surfaces of claim 11, wherein the electromagnetic radiation scattered on the surface for inspection is conveyed for measurements by a system of mirrors.

20. The apparatus for inspection of spherical surfaces of claim 11, wherein
the apparatus is integrated into a production equipment and performs an in-situ or in-tool inspection.

\* \* \* \* \*